US008463746B2

(12) United States Patent
Gundy et al.

(10) Patent No.: US 8,463,746 B2
(45) Date of Patent: Jun. 11, 2013

(54) METHOD AND SYSTEM FOR REPLICATING DATA

(75) Inventors: Lisa J. Gundy, Tucson, AZ (US); Beth A. Peterson, Tucson, AZ (US); Alfred E. Sanchez, Tucson, AZ (US); David M. Shackelford, Tucson, AZ (US); Warren K. Stanley, Loveland, CO (US); John G. Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 13/075,896

(22) Filed: Mar. 30, 2011

(65) Prior Publication Data
US 2012/0254114 A1 Oct. 4, 2012

(51) Int. Cl.
*G06F 17/00* (2006.01)
(52) U.S. Cl.
USPC ........... 707/639; 707/610; 707/640; 707/661; 709/248
(58) Field of Classification Search
CPC ............ G06F 17/30575; G06F 11/1451; G06F 17/30067; H04L 29/0854
See application file for complete search history.

(56) References Cited

U.S. PATENT DOCUMENTS

| 6,728,736 | B2 | 4/2004 | Hostetter et al. | |
|---|---|---|---|---|
| 6,842,825 | B2 * | 1/2005 | Geiner et al. | 711/133 |
| 7,127,477 | B2 * | 10/2006 | Duncombe et al. | 709/238 |
| 7,613,785 | B2 | 11/2009 | Chen et al. | |
| 8,200,921 | B2 * | 6/2012 | Cochran et al. | 711/162 |
| 2002/0103980 | A1 * | 8/2002 | Crockett et al. | 711/162 |
| 2003/0120685 | A1 * | 6/2003 | Duncombe et al. | 707/200 |
| 2004/0030837 | A1 * | 2/2004 | Geiner et al. | 711/133 |
| 2004/0267835 | A1 * | 12/2004 | Zwilling et al. | 707/202 |
| 2005/0203972 | A1 * | 9/2005 | Cochran et al. | 707/204 |
| 2006/0179343 | A1 * | 8/2006 | Kitamura | 714/6 |
| 2006/0182020 | A1 * | 8/2006 | Factor et al. | 370/220 |
| 2006/0182050 | A1 * | 8/2006 | Dohm | 370/312 |
| 2006/0212667 | A1 * | 9/2006 | Mikami | 711/162 |
| 2008/0235296 | A1 * | 9/2008 | He et al. | 707/202 |
| 2010/0106685 | A1 * | 4/2010 | Ott et al. | 707/611 |
| 2011/0258408 | A1 * | 10/2011 | Akutsu et al. | 711/162 |

OTHER PUBLICATIONS

U.S. Appl. No. 13/076,024, filed Mar. 30, 2011 and entitled "System, Method, and Computer Program Product for Disaster Recovery Using Asynchronous Mirroring," 47 pages.
U.S. Appl. No. 13/075,542, filed Mar. 30, 2011 and entitled "Prevention of Overlay of Production Data by Point in Time Copy Operations in a Host Based Asynchronous Mirroring Environment," 29 pages.

* cited by examiner

*Primary Examiner* — Apu Mofiz
*Assistant Examiner* — Hung Le
(74) *Attorney, Agent, or Firm* — Griffiths & Seaton PLLC

(57) ABSTRACT

Methods, computing environments, and computer program products are provided for replicating data. Point-in-time copy parameters are generated at a primary host site. A side file entry having the point-in-time copy parameters and a track information field (TIF) associated with the point-in-time copy parameters is generated. The side file entry is transferred to a secondary host site. A point-in-time copy process is performed at the secondary host site based on the point-in-time copy parameters and the TIF.

20 Claims, 5 Drawing Sheets

METHOD AND SYSTEM FOR REPLICATING DATA

BACKGROUND OF THE INVENTION

1. Field of the Invention

The present invention relates in general to computers, and more particularly to methods, systems, and computer program products for replicating data, particularly for point-in-time copying within an asynchronous mirroring environment.

2. Description of the Related Art

Mirroring is a form of disaster recovery in network storage systems. In mirroring, data written to a primary storage volume is also written to a secondary storage volume. The volumes may be logical storage volumes of the same or different storage devices, like hard disk drives. In synchronous mirroring, data written to the primary storage volume is simultaneously written to the secondary storage volume. The data is not considered as having been written to the primary storage volume unless it also has been written to the secondary storage volume.

By comparison, in asynchronous mirroring, data written to the secondary storage volume is written at some point in time after the data has been written to the primary storage volume. The data is considered as having been written to the primary storage volume even before it has been written to the secondary storage volume. Asynchronous mirroring permits the secondary storage volume to be located at a significant distance away from the primary storage volume, without incurring the performance penalty that results with synchronous mirroring where the volumes are located at a significant distance away from each other.

SUMMARY OF THE DESCRIBED EMBODIMENTS

In one embodiment, a method for replicating data is provided. Point-in-time parameters are generated at a primary host site. A side file entry having the point-in-time copy parameters and a track information field (TIF) associated with the point-in-time copy parameters is generated. The side file entry is transferred to a secondary host site.

In another embodiment, a computing environment for replicating data is provided. The computing environment includes a primary host site adapted to generate point-in-time copy parameters and generate a side file entry having the point-in-time copy parameters and a track information field (TIF) associated with the point-in-time copy parameters.

In a further embodiment, a computer program product for replicating data is provided. The computer program product has computer-readable program code portions stored thereon. The computer-readable program code portions include a first executable portion, a second executable portion, and a third executable portion. The first executable portion is for generating point-in-time copy parameters at a primary host site. The second executable portion is for generating a side file entry having the point-in-time copy parameters and a track information field (TIF) associated with the point-in-time copy parameters. The third executable portion is for transferring the side file entry to a secondary host site.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
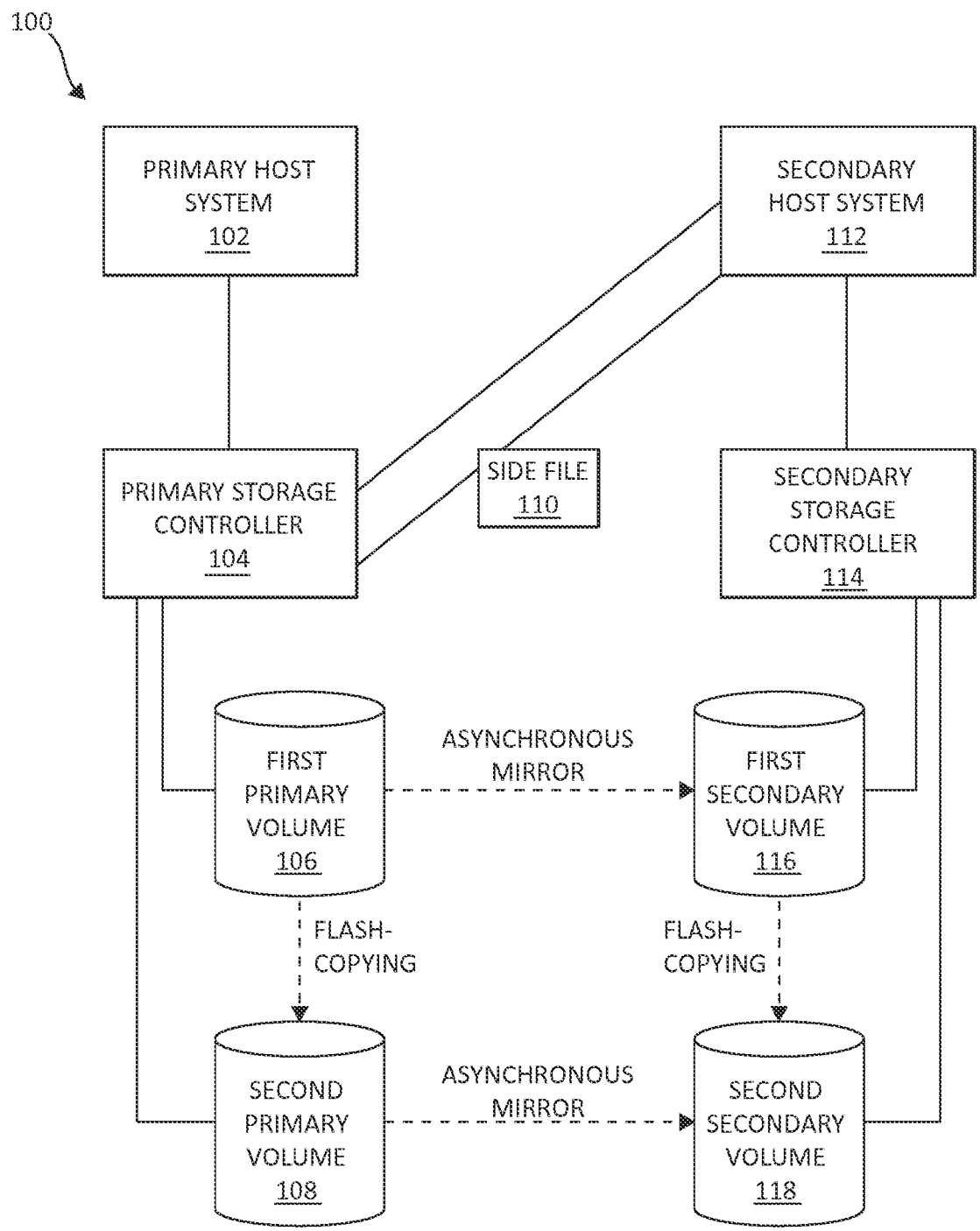
FIG. 1 is a block diagram of a system in which asynchronous mirroring and point-in-time copying occur, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

In one embodiment, a method for replicating data, or more particularly, point-in-time copying of data in a data replication system, is provided. Point-in-time copy parameters are generated at a primary host site. A side file entry having the point-in-time copy parameters and a track information field (TIF) associated with the point-in-time copy parameters is generated. The side file entry is sent to a secondary host site. A point-in-time copy process is performed at the secondary host site based on the point-in-time copy parameters and the TIF.

The side file entry may emulate a standard track side file. More specifically, the side file entry may emulate a count key data (CKD) record, such as an R1 CKD record. As such, the side file entry may include point-in-time copy parameters in a data track format. A side file may be generated that includes such a side file entry with point-in-time copy parameters and an additional side file entry(ies) that include track write information.

As is described in greater detail below, in order to keep the data between the primary and secondary (or remote) sites consistent, when a point-in-time copy command arrives on the primary storage controller and is to be sent to the remote site, the command parameters are packaged as a side file entry and a special track information field (TIF) associated with the entry. When this entry is read via the read record set (RRS) command, the system data mover (SDM) software recognizes the special TIF and appropriately parses the side file entry. The SDM software then builds and sends the appropriate point-in-time copy command to the remote site.

The TIF may include coded data that describes tracking information. The tracking information may include where the information stored in a data object originated, what the information type is based upon known task codes from various specifications, where the information type is used and how it is used. These aspects of information may provide background information useful for interpreting information stored in a data object.

As noted in the background section, asynchronous mirroring permits the secondary storage volume to be located at a significant distance away from the primary storage volume without incurring a performance penalty while updating the primary storage volume. Asynchronous mirroring can also be referred to as extended remote copying. Furthermore, another data backup technique is point-in-time copying, which is also referred to as point-in-time copying, snapshot copying, or shadow copying. In point-in-time copying, such as FlashCopy® available from International Business Machines Corp. ("IBM"), of Armonk, N.Y., where FlashCopy® is a registered trademark of IBM, a source storage volume, or portions of a storage volume, is copied to a target storage volume instantaneously or nearly instantaneously. Point-in-time copying (or, for the purposes of this application, "flash-copying") particularly permits for completion of copying of a source storage volume to a target storage volume to be signaled prior to data on the source storage volume having been physically copied to the target storage volume. It is noted that the terminology "volume" is used synonymously herein as shorthand for the terminology "storage volume."

Point-in-time copying may be desired to be performed in the context of an asynchronous mirroring environment. For instance, a first primary volume may be asynchronously mirrored to a first secondary volume located a significant distance away from the primary volume, for data protection purposes. A large number of write or update operations may be desired to be performed in an atomic batch manner at the first primary volume, such that either all the operations succeed, or none of the operations succeed. Therefore, the first primary volume may be copied to a second primary volume that is more local to the first primary volume than the first secondary volume is. There is also a second secondary volume that is more local to the first secondary volume than the first primary volume is.

The second primary volume is further being asynchronously mirrored to the second secondary volume. As such, point-in-time copying of the first primary volume to the second primary volume means that the first secondary volume also has to be point-in-time copied, to the second secondary volume. However, presently point-in-time copying in such an asynchronous mirroring environment cannot be achieved.

By comparison, embodiments of the invention permit point-in-time copying to be performed within an asynchronous mirroring environment. The asynchronous mirroring environment can be the mirroring environment provided by technology known as z/OS® Global Mirror available from International Business Machines Corp. ("IBM"), of Armonk, N.Y., where z/OS® is a registered trademark of IBM. A primary host system sends a command to a primary storage controller to specify that a first primary volume is to be point-in-time copied to a second primary volume. The primary storage controller verifies at least the state of the first and second primary volumes, to determine whether at least their state permits point-in-time copying to occur.

In turn, the secondary host system verifies at least the configuration of the first and second secondary volumes, to determine whether at least their configuration permits point-in-time copying to occur. If so, the secondary host system sends a query to a secondary storage controller, to determine whether a state of the first and second secondary storage controller permits point-in-time copying to occur. If the secondary storage controller successfully verifies this state, it responds back to the secondary host system that point-in-time copying can occur. The secondary host system then responds back to the primary storage controller that point-in-time copying can occur. The primary storage controller can therefore begin point-in-time copying the first primary volume to the second primary volume, with the knowledge that the first secondary volume will at some point later in time be successfully point-in-time copied to the second secondary volume.

As such, embodiments of the invention provide for a manner by which the primary storage controller can determine whether point-in-time copying between the first and second secondary volumes can occur, which in turn dictates whether the primary storage controller should point-in-time copy the first primary volume to the second primary volume. The primary storage controller may be unaware of and unable to communicate with the secondary storage controller. As such, the primary storage controller instead sends a query to the secondary host system, which in turn sends a query to the secondary storage controller. If the verifications performed by the primary storage controller, the secondary host system, and the secondary storage controller are all successful, then point-in-time copying can commence between the first and second primary volumes, and subsequently between the first and second secondary volumes.

FIG. 1 illustrates a system 100, according to an embodiment of the invention. The system 100 includes a primary host system 102, a primary storage controller (or storage controller device) 104, a first primary volume 106, and a second primary volume 108. The host system 102, the controller 104, and the volumes 106 and 108 may be located in a local manner in relation to one another. For instance, all these components may be located in the same room, or the same building.

The system 100 also includes a secondary host system 112, a secondary storage controller 114, a first secondary volume 116, and a second secondary volume 118. The host system 112, the controller 114, and the volumes 116 and 118 also may be located in a local manner in relation to one another. However, the host system 112, the controller 114, and the volumes 116 and 118 may be located remote to the host system 102, the controller 104, and the volumes 106 and 108. For instance, the former components may be located in a different building, a different city, a different state, or even in a different country than the latter components.

Still referring to FIG. 1, a solid line between two components indicates that the components may directly communicate with one another, such as over a network or a direct cable connection, without having to pass communication through any other component. A dashed line indicates an operation performed in relation to the latter component with reference to the former component.

It should be understood that the terminology "primary" and "secondary" is used herein mainly to distinguish the components on the left-hand side of FIG. 1 from the components on the right-hand side of FIG. 1. The secondary components on the right-hand side of FIG. 1 may also be considered as subordinate to the primary components on the left-hand side of FIG. 1.

In one embodiment, the primary host system 102 includes one or more computing devices, like server computer devices, which process information by writing data to, updating data on, and reading data from the first primary volume 106. In this respect, the primary host system 102 interacts with the primary storage controller 104. The primary storage controller 104 in turn directly interacts with the primary volumes 106 and 108.

The primary volumes 106 and 108 may be logical storage volumes on the same or different storage devices, such as hard disk drives, arrays of hard disk drives, and so on. In one embodiment, the first primary volume 106 is periodically point-in-time copied to the second primary volume 108, as indicated by a dashed line in FIG. 1. That is, as desired, a point-in-time copy of the first primary volume 106 may be made to the second primary volume 108.

Still referring to FIG. 1, the primary storage controller 104 directly interacts with the secondary host system 112 in various ways. First, the primary storage controller 104 may store data in a side file 110, which is then retrieved by the secondary host system 112. The side file 110 is a logical data file that is stored on a volume of a storage device, in the cache of the primary storage controller 104, and/or on a non-volatile storage device, among other places. Second, the primary storage controller 104 may directly communicate with the secondary host system 112 without using the side file 110, as indicated by the solid line connecting the controller 104 and the host system 112. Additional details of the side file 110, in accordance with one aspect of the present invention, are provided below.

The secondary host system 112 may also include one or more computing devices. The secondary host system 112 is, in one embodiment, responsible for at least in part managing an asynchronous mirroring relationship between the first primary volume 106 and the first secondary volume 116, as indicated by the respective dashed line in FIG. 1. That is, the first primary volume 106 is asynchronously mirrored to the first secondary volume 116.

For example, when the primary host system 102 performs a write or update operation, the host system 102 sends the operation to the primary storage controller 104. The primary storage controller 104 performs the operation in relation to the first primary volume 106 and stores the operation in the side file 110. The primary storage controller 104 signals back to the primary host system 102 that the operation has been completed. At some point later in time, the secondary host system 112 retrieves the operation from the side file 110 and interacts with the secondary storage controller 114 to cause the operation to be performed in relation to the first secondary volume 116. As such, the current contents of the first secondary volume 116 mirror the past contents of the first primary volume 106.

Thus, as with the primary host system 102, the primary storage controller 104, and the primary volumes 106 and 108, the secondary host system 112 interacts with the secondary storage controller 104, which in turn directly interacts with the secondary volumes 116 and 118. Similar to the primary volumes 106 and 108, the secondary volumes 116 and 118 may be logical storage volumes on the same or different storage devices. The storage devices implementing the secondary volumes 116 and 118 may be hard disk drives, arrays of hard disk drives, and so on, and are different than the storage devices implementing the primary volumes 106 and 108.

The first secondary volume 116 may periodically be point-in-time copied to the second secondary volume 118, as indicated by a dashed line in FIG. 1. For instance, it may determined that the configuration and state of the volumes 106, 108, and 116, and 118 permit point-in-time copying of the first primary volume 106 to the second primary volume 108 and point-in-time copying of the first secondary volume 116 to the second secondary volume 118, as is described in detail below. Thereafter, the primary storage controller 104 initiates point-in-time copying from the first primary volume 106 to the second primary volume 108, reports back to the primary host system 102 that point-in-time copying has succeeding, and writes a point-in-time copy operation to the side file 110.

The secondary host system 112 reads the point-in-time copy operation at some later point in time and instructs the secondary storage controller 114 to point-in-time copy the first secondary volume 116 to the second secondary volume 118. The secondary storage controller 114 then initiates point-in-time copying from the first secondary volume 116 to the second secondary volume 118. Once point-in-time copying has been completed, the contents of the second secondary volume 118 mirror the past contents of the second primary volume 108.

Thus, there are four logical operations indicated by dashed lines in FIG. 1. First, the first primary volume 106 is asynchronously mirrored to the first secondary volume 116. Second, the second primary volume 108 is asynchronously mirrored to the second secondary volume 118. Third, the first primary volume 106 is point-in-time copied to the second primary volume 108. Fourth, the second primary volume 108 is point-in-time copied to the second secondary volume 118.

As noted above, point-in-time copying of the first primary volume 106 to the second primary volume 108 may be performed only if the asynchronous mirroring relationship between the second primary volume 108 and the second secondary volume 118 can be properly maintained. That is, the state and configuration of the secondary volumes 116 and 118 have to be verified to ensure that the first secondary volume 116 can be point-in-time copied to the second secondary volume 118. Otherwise, if the first primary volume 106 is still point-in-time copied to the second primary volume 108, the second secondary volume 118 will no longer asynchronously mirror the second primary volume 108.

Furthermore, point-in-time copying the first primary volume 106 to the second primary volume 108 should be performed only if the configuration and state of the primary volumes 106 and 108 permit such point-in-time copying. Therefore, if the configuration or state of the primary volumes 106 and 108 does not permit point-in-time copying, or if the configuration or state of the secondary volumes 116 and 118 does not permit point-in-time copying, then point-in-time copying should not be performed.

Some embodiments of the invention are thus directed to verifying these configurations and states, even in light of the architecture of FIG. 1, in which the primary storage controller 104 is unaware of the configuration and state of the secondary volumes 116 and 118. Some embodiments of the invention are further directed to verifying these configurations and states, even in light of the architecture of FIG. 1, in which the primary storage controller 104 is also unaware of and cannot directly communicate with the secondary storage controller 114 to learn the configuration and state of the secondary volumes 116 and 118.

In accordance with one particular aspect of the present invention, in order to create a mechanism to transfer the point-in-time copy command from the primary site to the remote site, a new TIF and associated side file entry is used. This allows the primary storage controller 104 to package and communicate the command received at the primary site to the SDM software which will then be able to package and communicate the command to the secondary storage controller 114.

In one embodiment, with reference to FIG. 1, the primary host system 102 first issues a point-in-time copy command to the primary storage controller 104. In response, the primary storage controller 104 generates the point-in-time copy side file (e.g., side file 110) with the TIF. The SDM (e.g., at the secondary host system 112) then issues the RRS command to the primary storage controller 104. The primary storage controller 104 responds with the side file entry (e.g., side file 110)

containing the point-in-time copy side file entry and TIF. The SDM (and/or the secondary host system 112) parses the side file entry and builds the appropriate point-in-time copy command based on the entry and TIF. The secondary host system 112 then issues the point-in-time copy command to the secondary storage controller 114, which in turn performs a point-in-time copy process (e.g., between the first secondary volume 116 and the second secondary volume 116).

Figure 2:
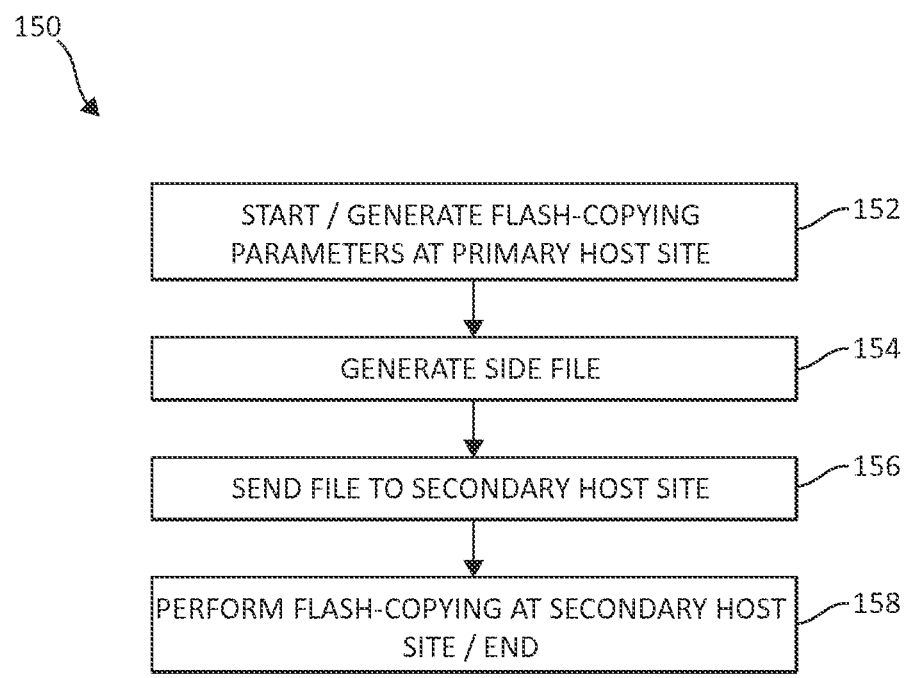
FIG. 2 is a flowchart of a method for point-in-time copying in relation to the system of FIG. 1, according an embodiment of the invention.

As such, in one embodiment of the present invention, a method 150 for replicating data and/or point-in-time copying data is provided, as depicted in FIG. 2. At 152, the method 150 begins with point-in-time copy parameters being generated at a primary host site (i.e., the point-in-time copy command is sent to the primary storage controller 104 from the primary host system 102). At 154, the side file entry having the point-in-time copy parameters and TIF associated with the point-in-time copy parameters is generated. At 156, the side file is sent to the secondary host site (i.e., the secondary host system 112). At 158, the method 150 ends with a point-in-time copy process at the secondary host site based on the point-in-time copy parameters and the TIF.

Table 1, shown below, shows the format of the TIF associated with the point-in-time copy command, according to one embodiment of the present invention.

TABLE 1

| Byte | Description |
|---|---|
| 0 | Format<br>X'00' - Reserved<br>X'01' - XRC<br>X'02' - FlashCopy onto XRC |
| 1 | Flags<br>Bit 0: Non-timestamped write<br>Bit 1: Record not set available to be read<br>Bit 2: 1 = this record set is for the source; 0 = this record set is for the target<br>Bit 3: 1 = a corresponding source/target record set was created; 0 = this is the only record set for this operation<br>Bits 4-7 Reserved<br>Note: The Bit 3 = 0 condition (no corresponding record set) is for the Withdraw case where only one device is specified. |
| 2 | Reserved for device address modification in the host. This byte is for use by VM for device virtualization. |
| 3 | Device unit address (CCA) the FC command was received on<br>Note: At present, this will always be the source device for establish, and could be either the source or target devices for withdraw. |
| 4 | Source LSS |
| 5 | Source device (CCA) |
| 6 | Target LSS |
| 7 | Target device (CCA) |
| 8 | Session Type<br>X'10' - single reader<br>X'50' - enhanced multi-reader |
| 9 | Session ID |
| 10 | Status flags<br>Bit 0: Unused<br>Bit 1: Unused<br>Bit 2: Null entry<br>Bit 3: TIF fields modified<br>Bit 4: Unused<br>Bit 5: Source device info valid<br>Bit 6: Target device info valid |
| 11 | Reserved |
| 12-13 | Sequence Number |
| 14 | Operation byte<br>Bit 0: 1 = Establish, 0 = Withdraw<br>Bit 1: 1 = Withdraw from source, 0 = withdraw from target<br>Bits 2-7: Reserved |
| 15 | Reserved |
| 16-23 | Timestamp copied from the partner volume's session. 0 if no timestamp copied.<br>Note: this field is only filled in on the 2nd record set which is the record set for the target device. At the time the source record set is created the target record set's time is not known. When the target record set is created, the source record set timestamp is known and can be inserted in this field. |
| 24-31 | Timestamp set from this session's time |

In one embodiment, the side file entries for the point-in-time copy command (e.g., FlashCopy Establish and/or Withdraw commands) are placed into the same side file that contains the "normal" recordsets representing writes to a track. To distinguish the two types, the recordsets for a write to a track are called "Track Recordsets" and recordsets for Flash-Copy commands are called "FlashCopy Recordsets." The FlashCopy Recordset emulates an R1 user record, as is commonly understood in the art.

In one example, for Establish point-in-time copy (e.g., FlashCopy) side file entries, there is a source and target side file entry associated with Establish commands. The source side file entry consists of the new format TIF, followed by a count field, followed by a data field consisting of the command parameters, followed by a pseudo count (8 bytes of 0xFFs). The target entry will consist of the new TIF and a pseudo count. For Withdraw point-in-time copy side file entries, there is a single side file entry that is associated with the target device (or storage volume or entry for the source volume). This entry consists of the new format TIF, followed by a count field, followed by a data field consisting of the command parameters, followed by a pseudo count (e.g., 8 bytes of 0xFFs).

In one embodiment, the count field is an 8 byte field including: 2 bytes—cylinder; 2 bytes—head; 1 byte—record; 1 byte—key length; 2 bytes—data length. The cylinder/head bytes (i.e., track address) may be any value, but it is beneficial for them to be the first track of the Establish or Withdraw respectively. The record value is, for example, set to 0x01, the key length is set to 0, and the data length is set to the length of the parameters stored in the emulated data field.

Figure 3:
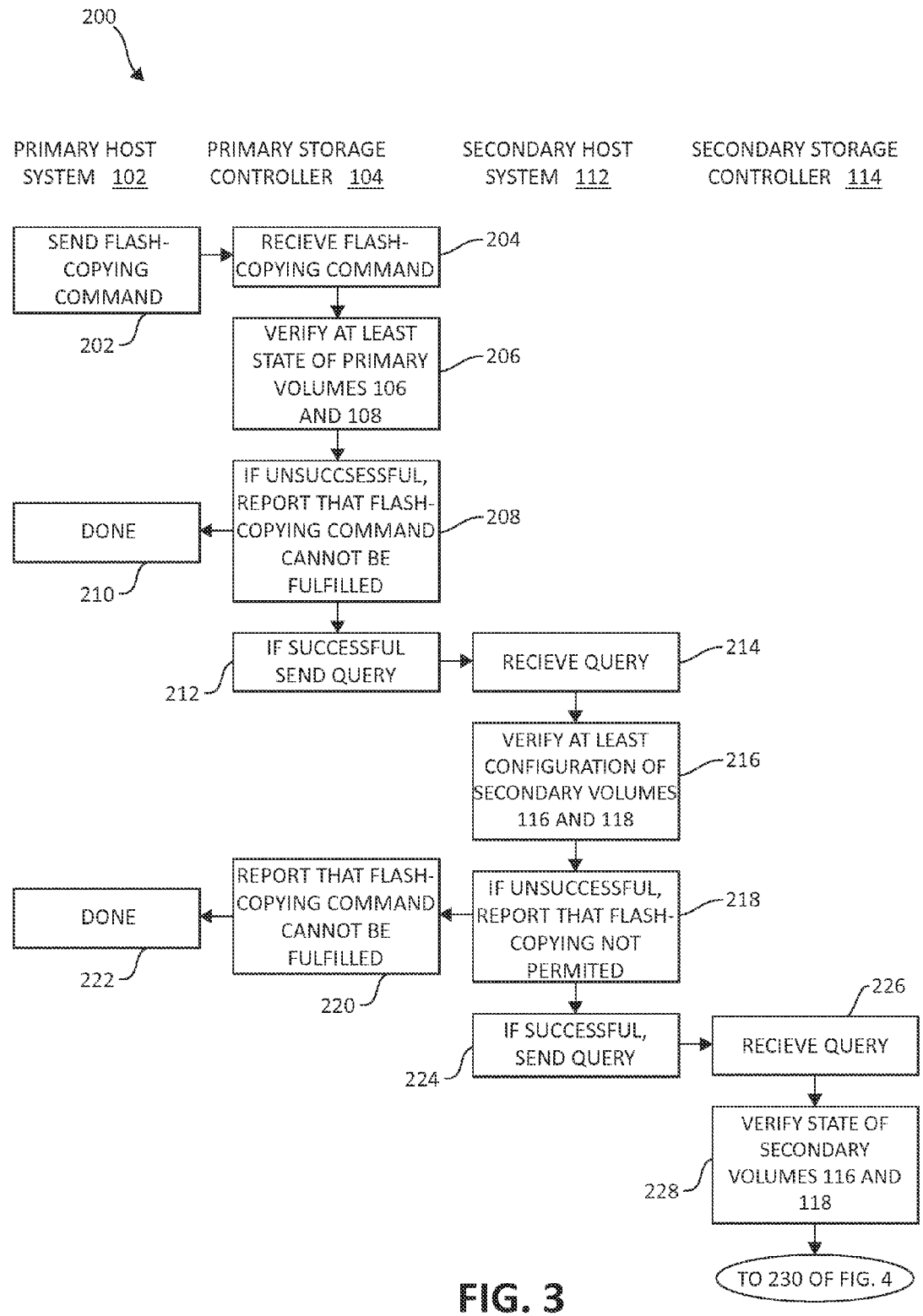
FIGS. 3, 4, and 5 are flowcharts of a method for performing point-in-time copying in relation to the system of FIG. 1 including aspects in addition to those shown in FIG. 2, according to an embodiment of the invention.
Figure 4:
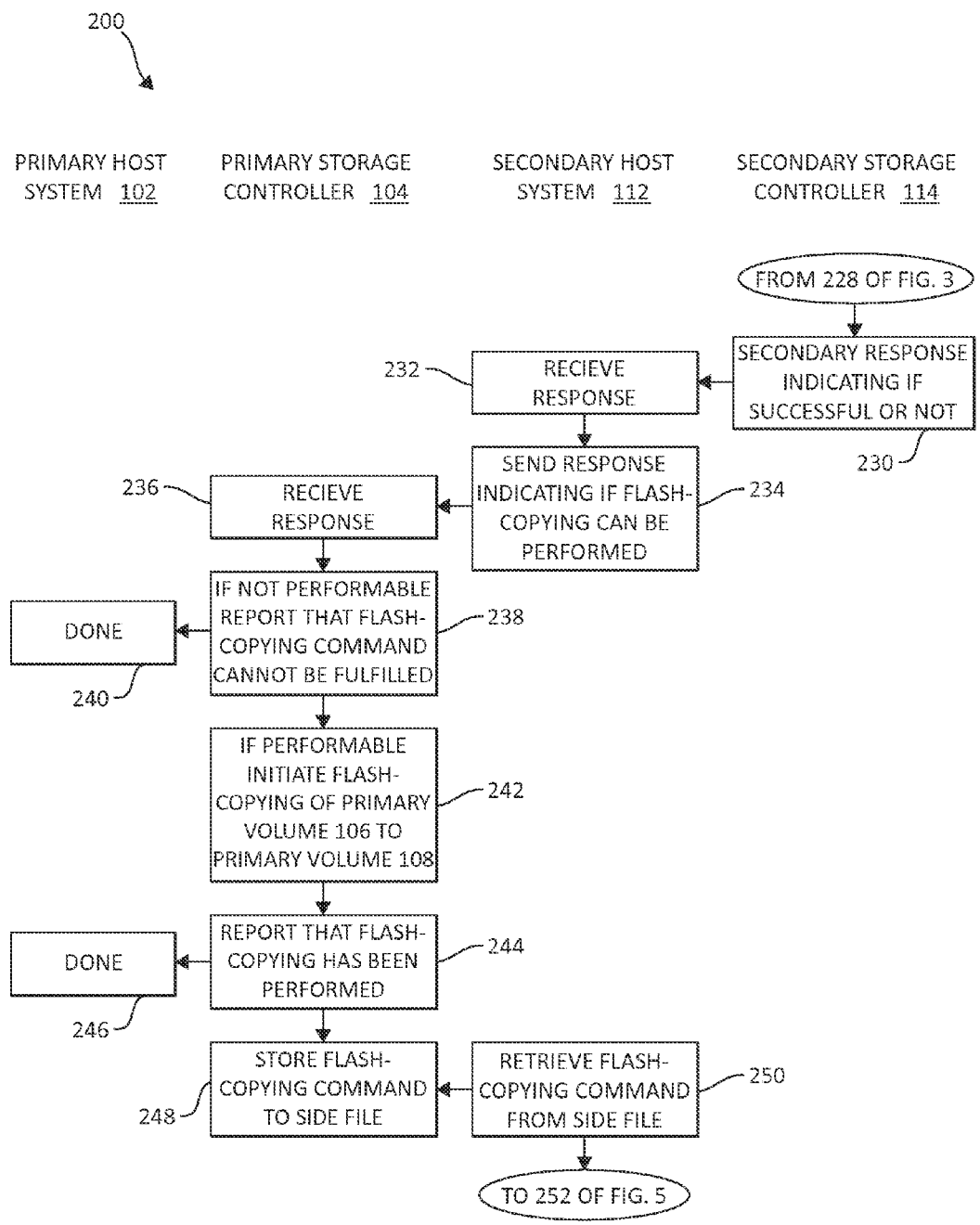
Figure 5:
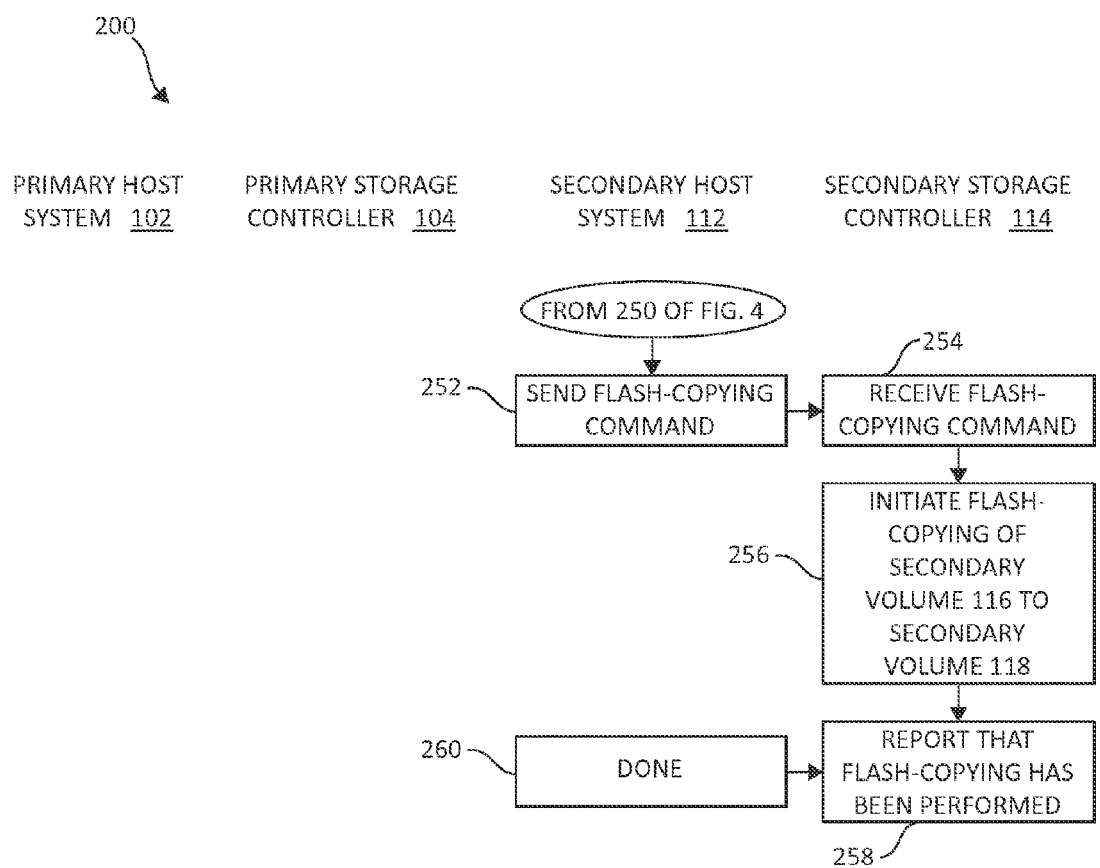

FIGS. 3, 4, and 5 jointly illustrate a method 200 for performing point-in-time copying within the asynchronous mirroring environment of the system 100 of FIG. 1, according to additional aspects of the present invention. As shown, FIGS. 3, 4, and 5 are divided over four columns. In one embodiment, the portions (or steps or blocks) of the method 200 in the first (i.e., the left-most) column are performed by the primary host system 102. The portions of the method 200 in the second (i.e., the second left-most) column are performed by the primary storage controller 104. The portions of the method 200 in the third (i.e., the second right-most column) are performed by the secondary host system 112. The portions of the method 200 in the fourth (i.e., the right-most column) are performed by the secondary storage controller 114.

Referring to FIG. 3, at 202, the primary host system 102 sends a point-in-time copy command to the primary storage controller 104, which receives the command at 204. The point-in-time copy command specifies that the first primary volume 106 is to be point-in-time copied to the second primary volume 108. As noted above, point-in-time copying provides for completion of copying the first primary volume 106 to the second primary volume 108 to be signaled by the primary storage controller 104 to the primary host system 102, prior to data on the first primary volume 106 being physically copied to the second primary volume 108.

In response to receiving the point-in-time copy command, at 206, the primary storage controller 104 verifies at least the state of the primary volumes 106 and 108 to determine whether at least their state permits point-in-time copying of the first primary volume 106 to the second primary volume 108. The primary storage controller 104 may also verify the configuration of the primary volumes 106 and 108 to determine whether their configuration permits point-in-time copying of the first primary volume 106 to the second primary volume 108. Alternatively, the primary host system 102 may have verified the configuration of the primary volumes 106 and 108 before sending the point-in-time copy command to the primary storage controller 104.

The configuration of the primary volumes 106 and 108 is at least relatively static, involving how the primary volumes 106 and 108 are architecturally connected within the system 100. By comparison, the state of the primary volumes 106 and 108 is at least relatively dynamic, involving the current condition of the primary volumes 106 and 108. If the configuration of the primary volumes 106 and 108 permit point-in-time copying, the state of the primary volumes 106 and 108 may still not permit point-in-time copying. By comparison, if the configuration of the primary volumes 106 and 108 do not permit point-in-time copying, then the state of the primary volumes 106 and 108 does not matter. As such, both the configuration and the state of the primary volumes 106 and 108 have to permit point-in-time copying for point-in-time copying from the first primary volume 106 to the second primary volume 108 to occur.

The configuration verification may include determining that the primary volumes 106 and 108 are both in an asynchronous mirroring session. The configuration verification can also include determining that the primary volumes 106 and 108 are controlled by the same primary storage controller 104. Other configuration verifications include determining that the primary storage controller 104 and the secondary storage controller 104 include software that support point-in-time copying.

The state verification may include determine that the primary volumes 106 and 108 are both active volumes within an asynchronous mirroring session. The state verification may also include determining that the primary volumes 106 and 108 are not presently participating in any other point-in-time copy relationships that would conflict with point-in-time copying the first primary volume 106 to the second primary volume 108.

If the verification is unsuccessful, at 208, the primary storage controller 104 sends a response to the primary host system 102 indicating that the point-in-time copy command cannot be fulfilled. The primary host system 102 receives this response at 210. As such, the method 200 is finished.

If the verification is successful, at 212, the primary storage controller 104 responsively sends a query to the secondary host system 112, which receives the query at 214. The query requests that the secondary host system 112 indicate whether the first secondary volume 116 can be point-in-time copied to the second secondary volume 118. The query may include a token that at last substantially uniquely identifies the query, so that the query can be differentiated from other queries that the primary storage controller 104 may send or may have sent to the secondary host system 112.

In response to receiving the query, at 216, the secondary host system 112 verifies at least the configuration of the secondary volumes 116 and 118 to determine whether at least their configuration permit the first secondary volume 116 to be point-in-time copied to the second secondary volume 118. The configuration that is verified in relation to the secondary volumes 116 and 118 may correspond to the configuration that has been at least implicitly verified in relation to the primary volumes 106 and 108, as described above. For instance, the configuration verification may include determining that the secondary volumes 116 and 118 are controlled by the same secondary storage controller 114. The configuration verification can also include determining that the pair of volumes 106 and 116 and the pair of volumes 108 and 118 are each within an asynchronous mirroring session.

The secondary host system 112 may also verify the state of the secondary volumes 116 and 118 in part 216. For example, the state verification may include determining that the first secondary volume 116 is in duplex status with the first primary volume 106 and that the second secondary volume 118 is in duplex status with the second primary volume 108. Duplex status between a secondary volume and a primary volume indicates that the secondary volume is currently and properly asynchronously mirroring the primary volume.

If the verification is unsuccessful, at 218, then the secondary host system 112 sends a response to the primary storage controller 104 indicating that the first secondary volume 116 cannot be point-in-time copied to the second secondary volume 118. At 220, the primary storage controller receives this response and in turn sends a response to the primary host system 102 that the point-in-time copy command cannot be fulfilled. The primary host system 102 receives this response, ending the method 200 at 222.

If the verification is successful, at 224, the secondary host system 112 sends a query to the secondary storage controller 114, which receives the query at 226. The query requests that the secondary storage controller 114 indicate whether the first secondary volume 116 can be point-in-time copied to the second secondary volume 118. The query may also include a token that least substantially uniquely identifies the query such that the query can be differentiated from other queries that the secondary host system 112 may send or may have sent to the secondary storage controller 114.

In response to receiving the query, at 228, the secondary storage controller 114 verifies the state of the secondary volumes 116 and 118 to determine whether their state permit the first secondary volume 116 to be point-in-time copied to the second secondary volume 118. If the secondary host system 112 had verified the state of the secondary volumes 116 and 118 in part 216, then the secondary storage controller 114 verifies different state information than the secondary host system 112 verified. That is, the secondary storage controller 114 may verify one part of the state of the secondary volumes 116 and 118, and the secondary host system 112 may verify a different part of this state.

The state of the secondary volumes 116 and 118 that is verified by the secondary storage controller 114 may correspond to the state of the primary volumes 106 and 108 that the primary storage controller 104 verified in part 206. For instance, the state information can include determining that the secondary volumes 116 and 118 are both active volumes within an asynchronous mirroring session. As another example, the state verification may include determining that the secondary volumes 116 and 118 are not presently participating in any other point-in-time copy relationships that would conflict with point-in-time copying the first secondary volume 116 to the second secondary volume 118.

Referring now to FIG. 4, at 230, the secondary storage controller 114 sends a response to the secondary host system 112 indicating whether the verification was successful or not, and at 232, the secondary host system 112 receives the response. The secondary host system 112 then, at 234, sends a response to the primary storage controller 104 indicating whether or not point-in-time copying from the first secondary volume 116 to the second secondary volume 118 may be performed. The primary storage controller 104 receives the response at 236. At 238, if point-in-time copying from the first secondary volume 116 to the second secondary volume 118 cannot be performed, then the primary storage controller 104 sends a response to the primary host system 102 indicating that the command to point-in-time copy the first primary volume 106 to the second primary volume 108 cannot be fulfilled. The primary host system 102 receives this response, ending the method 200 at 240.

As such, when the secondary storage controller 114 unsuccessfully verifies the state of the secondary volumes 116 and 118, the secondary storage controller 114 sends a response to the secondary host system 112 indicating that the state of the secondary volumes 116 and 118 does not permit point-in-time copying of the first secondary volume 116 to the second secondary volume 118. The secondary host system 112 then responsively sends a response to the primary storage controller 104 indicating that the first secondary volume 116 can not be copied to the second secondary volume 118. The primary storage controller 104 then responsively sends a response to the primary host system 102, indicating that the command specifying that the first primary volume 106 is to be point-in-time copied to the second primary volume 108 cannot be fulfilled.

Still referring to FIG. 4, at 242, if point-in-time copying from the first secondary volume 116 to the second secondary volume 118 can be performed, then the primary storage controller 104 initiates point-in-time copying of the first primary volume 106 to the second primary volume 108. Even before the data of the first primary volume 106 has been copied to the second primary volume 108, the primary storage controller 104 sends a response to the primary host system 102 that the point-in-time copy command has been fulfilled—that is, that the first primary volume 106 has been successfully point-in-time copied to the second primary volume 108 at 244. The primary host system 102 receives this response, ending the method 200 at 246.

As such, when the secondary storage controller 114 successfully verifies the state of the secondary volumes 116 and 118, the secondary storage controller 114 sends a response to the secondary host system 112 indicating that the state of the secondary volumes 116 and 118 permits point-in-time copying of the first secondary volume 116 to the second secondary volume 118. The secondary host system 112 then responsively sends a response to the primary storage controller 104 indicating that the first secondary volume 116 can be copied to the second secondary volume 118. The primary storage controller 104 then responsively initiates point-in-time copying of the first primary volume 106 to the second primary volume 108.

At 248, the primary storage controller 104 also stores, or writes, a point-in-time copy command to a side file 110, such as the side file and TIF described above. Storing the point-in-time copy command to the side file 110 may, in one embodiment, be considered as part of initiating the point-in-time copy operation in 242. At 250, the secondary host system 112 at some point in time after the point-in-time copy command has been written to the side file 110 retrieves, or reads, the point-in-time copy command from the side file 110.

Referring to FIG. 5, after reading the point-in-time copy command, the secondary host system 112 sends a point-in-time copy command to the secondary storage controller 114 at 252, which receives the point-in-time copy command at 254. The command specifies that the first secondary volume 116 is to be point-in-time copied to the second secondary volume 118. In response to receiving the point-in-time copy command, at 256, the secondary storage controller 114 initiates point-in-time copying of the first secondary volume 116 to the second secondary volume 118. The secondary storage controller 114 may then send a response back to the secondary host system 112 that the first secondary volume 116 has been point-in-time copied to the second secondary volume 118 at 258. The secondary host system 112 receives this response, ending the method 200 at 260.

It should be noted that execution orders of processes, such as operations, procedures, steps and stages in the devices, systems, programs and methods shown in the scope of claims, the description and the drawings, are not clearly specified particularly by use of expressions such as "before" and "prior to." Therefore, those processes are executable in any orders unless an output from a preceding process is used in a process subsequent thereto. Even if any operational flow in the scope of claims, in the description or in the drawings has been described by use of expressions such as "firstly," "subsequently," for the sake of convenience, this does not necessarily mean that the operational flow has to be executed by an order indicated by these expressions.

As can be appreciated by one those of ordinary skill within the art, aspects of the present invention may be embodied as a system, method or computer program product (including executable portions). Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code (or the associated executable portions thereof) for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for replicating data comprising:
generating point-in-time copy parameters at a primary host site;
generating a side file entry having the point-in-time copy parameters and a track information field (TIF) associated with the point-in-time copy parameters, the side file entry being placed in the same side file that contains recordsets representing writes to a track and includes a source side file entry and a target side file entry, wherein each of the source side file entry and the target side file entry include the TIF;
transferring the side file entry to a secondary host site;
parsing the side file entry at the secondary host site to build a point-in-time copy command based on the side file entry and the TIF; and
issuing the point-in-time copy command to a secondary storage controller of the secondary host site.

2. The method of claim 1, further comprising performing a point-in-time copy process at the secondary host site based on the point-in-time copy parameters and the TIF.

3. The method of claim 2, wherein the generating of the side file entry comprises emulating a standard track side file entry.

4. The method of claim 3, wherein the generating of the side file entry comprises emulating a count key data (CKD) record.

5. The method of claim 1, wherein the generating of the side file entry comprises generating the point-in-time copy parameters in a data track format.

6. The method of claim 1, wherein the generating of the side file entry comprises emulating an R1 count key data (CKD) record.

7. The method of claim 1, wherein the source file side entry includes a count field following the TIF, followed by a data field including command parameters, and a pseudo count.

8. The method of claim 1, wherein the target file side entry includes a pseudo count following the TIF.

9. A computing environment for replicating data comprising:
a primary host site adapted to:
generate point-in-time copy parameters; and
generate a side file entry having the point-in-time copy parameters and a track information field (TIF) associated with the point-in-time copy parameters, the side file entry being placed in the same side file that contains recordsets representing writes to a track and includes a source side file entry and a target side file entry, wherein each of the source side file entry and the target side file entry include the TIF; and a secondary host site adapted to:
parse the side file entry at the secondary host site to build a point-in-time copy command based on the side file entry and the TIF; and
issue the point-in-time copy command to a secondary storage controller of the secondary host site.

10. The computing environment of claim 9, wherein the secondary host site is further adapted to:
perform a point-in-time copy process based on the point-in-time copy parameters and the TIF.

11. The computing environment claim 9, wherein the generating of the side file entry comprises emulating a standard track side file entry.

12. The computing environment of claim 11, wherein the generating of the side file entry comprises emulating a count key data (CKD) record.

13. The computing environment of claim 9, wherein the generating of the side file entry comprises generating the point-in-time copy parameters in a data track format.

14. The computing environment of claim 9, wherein the generating of the side file entry comprises emulating an R1 count key data (CKD) record.

15. A computer program product for replicating data, the computer program product having a non-transitory computer readable medium including computer-readable program code portions stored thereon, the computer-readable program code portions comprising:
a first executable portion for generating point-in-time copy parameters at a primary host site;
a second executable portion for generating a side file entry having the point-in-time copy parameters and a track information field (TIF) associated with the point-in-time copy parameters, the side file entry being placed in the same side file that contains recordsets representing writes to a track and includes a source side file entry and a target side file entry, wherein each of the source side file entry and the target side file entry include the TIF;
a third executable portion for transferring the side file entry to a secondary host site;
a fourth executable portion for parsing the side file entry at the secondary host site to build a point-in-time copy command based on the side file entry and the TIF; and
a fifth executable portion for issuing the point-in-time copy command to a secondary storage controller of the secondary host site.

16. The computer program product of claim 15, further comprising a sixth executable portion for performing a point-in-time copy process at the secondary host site based on the point-in-time copy parameters and the TIF.

17. The computer program product of claim 16, wherein the generating of the side file entry comprises emulating a standard track side file entry.

18. The computer program product of claim 17, wherein the generating of the side file entry comprises emulating a count key data (CKD) record.

19. The computer program product of claim 15, wherein the generating of the side file entry comprises generating the point-in-time copy parameters in a data track format.

20. The computer program product of claim 19, wherein the generating of the side file entry comprises emulating an R1 count key data (CKD) record.

* * * * *